Dec. 29, 1931.  H. D. GEYER  1,839,025

STEERING WHEEL

Filed Dec. 15, 1930

Inventor
Harvey D. Geyer
By Spencer Hardman & Fehr
His Attorneys

Patented Dec. 29, 1931

1,839,025

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

STEERING WHEEL

Application filed December 15, 1930. Serial No. 502,413.

This invention relates to improvements in metal-reinforced molded steering wheels.

An object of this invention is to provide a very strong but light and well-appearing molded composition hand-wheel. A feature of this wheel is the separate metal hub adapted to be rigidly clamped to the central portion of the molded metal-reinforced main portion of the wheel after said main portion is covered with the molded composition. This separate attachment of the hub greatly simplifies and reduces the cost of the molding operation since the metal skeleton, serving as the reinforcement, may be easily set within the mold as an insert and substantially encased with the molded composition, such as hard rubber, since the separate hub is detached from the skeleton at this time. The metal hub-ring of the skeleton insert has projections thereon which extend outwardly to the surface of the molded composition and serve as metal abutments against which the separate hub is later clamped, thereby giving a metal to metal rigid contact between said separate hub and hub-ring, whereby any subsequent shrinkage of the molded composition lying between said hub and hub-ring can have no effect upon the tightly clamped relationship between said separate hub and wheel.

Further objects and advantages of the present invention will be apparent from the following description, reference being had to the accompanying drawings wherein a prefered embodiment of one form of the present invention is clearly shown.

In the drawings.

Similar reference characters refer to similar parts throughout the several views.

Figure 4:
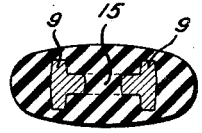
Fig. 4 is a full size section through the spoke taken on line 4—4 of Fig. 1.

The spider insert 10, which may be of die cast aluminum or malleable iron, comprises a central hub-ring 11 of relatively large diameter and the four arms 12 radiating therefrom. A steel hoop 13, preferably of flat section with the long dimension positioned vertically as shown in Fig. 2, abuts and is rigidly fixed to the outer ends of arms 12 by screws 14 which are threaded into tapped holes in the ends of arms 12. This steel hoop 13 will form a very strong shock-resisting reinforcing member for the molded rim. In case of a crash, the driver's body may be hurled violently forward against the steering wheel. In such a case the steel hoop 13, being resilient, will not break and its secure attachment to the arm ends will prevent the rim from breaking free from the end of the spoke pointing towards the driver and so eliminates the possibility of the outer end of the spoke piercing the driver's body and causing a fatal accident. The metal arms 12 preferably have holes 15 cored therein to lighten the casting and serve as bonding interlocks for the molded composition, such as hard rubber, without materially decreasing the bending strength of the arms. Also for the same purpose arms 12 preferably are cast with lateral flanges 9 as clearly shown in Figs. 1 and 4.

Figure 1:
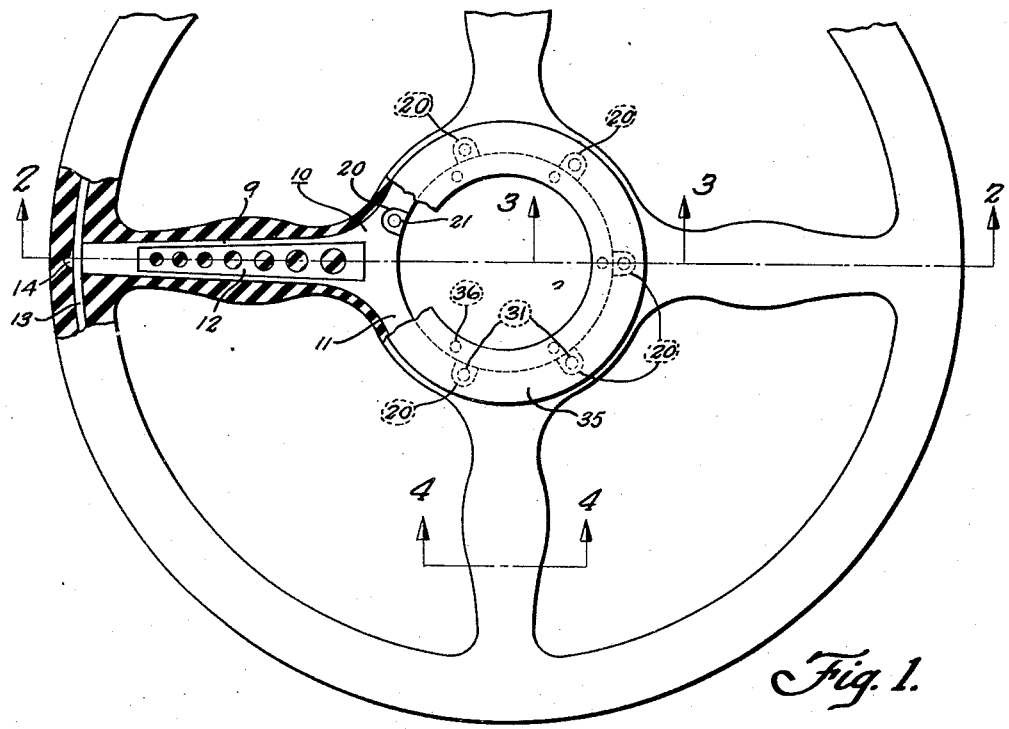
Fig. 1 is a partial plan view of an automobile steering wheel made according to this invention, but shows a portion of the molded composition cut away to better illustrate the metal skeleton insert.
Figure 2:
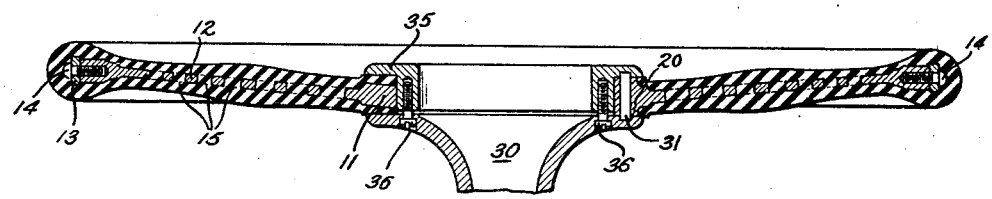
Fig. 2 is a vertical section taken on line 2—2 of Fig. 1.

The metal spider 10 with hoop 13 fixed thereto are covered with an uncured plastic rubber compound, after which it is set within a suitable vulcanizing mold and the rubber compound vulcanized to form a hard rubber body, as clearly shown in Figs. 1 and 2. The hard rubber body forms strong well-appearing molded rim and spokes whose cross section is independent of the section of the metal reinforcement therein. All exposed portions of the metal hub-ring 11 are also encased with hard rubber except the end surfaces of the 12 projections 20, which are preferably cast integral with the spider casting 10. The end surfaces of projections 20 preferably lie flush with the outer surface of the hard rubber. By this means the spider casting 10 is easily located properly in the die cavity since the ends of projections 20 will contact directly the upper and lower cavity walls, as will be readily understood.

After the wheel comes from the mold it ordinarily must have the flash trimmed therefrom and be polished for appearance sake. These operations are also greatly facilitated by being done prior to the attachment of the separate hub to the molded wheel, as will be obvious to those skilled in the art.

Figure 3:
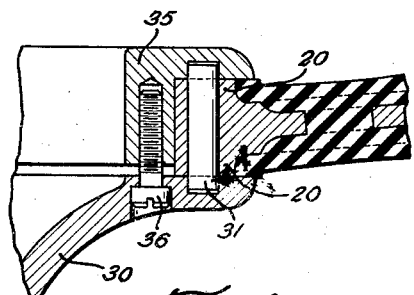
Fig. 3 is a vertical section taken on line 3—3 of Fig. 1 and shows on a larger scale a portion of Fig. 2.

A separately made hub 30 is then clamped to the central portion of the finished molded wheel as clearly illustrated in the drawings. Six driving pins 31 are slipped into the six apertures 21 drilled through the metal projections 20, after which the hub collar 35 is set within the large central aperture in the molded wheel and the lower main hub portion 30 clamped directly to the bottom of the wheel by the six screws which clamp the hub parts 30 and 35 tightly upon lower and upper faces respectively of the central portion of the molded wheel. As stated above in the objects of the invention, an important feature of this construction is the clamping of the hub parts 30 and 35 directly against the ends of the metal projections 20 on the metal hub-ring 11, as most clearly shown in Fig. 3, whereby the clamping pressure is taken by said projections 20 rather than by the hard rubber which lies between the metal ring 11 and hub parts 30 and 35 at all other parts except at the projections 20 as shown on the left side of Fig. 2. If the projections 20 were entirely omitted from the wheel shown, the hub parts would be clamped directly against the hard rubber as shown on the left of Fig. 2. In such a case the subsequent shrinkage of the hard rubber after several months use would reduce the clamping pressure obtained by screws 36 to zero, after which screws 36 would loosen rapidly and the wheel hub become so loose as to be dangerous to use. The projections 20 entirely eliminate such difficulties and they also serve to properly locate the entire metal insert in the mold cavity as described hereinabove.

While the form of embodiment of the present invention as herein disclosed, constitutes a preferred form, it is to be understood that other forms might be adopted, all coming within the scope of the claims which follow.

What is claimed is as follows:

1. A steering wheel comprising: a reinforcing metal skeleton having a central hub ring, metal spokes and rim ring, said skeleton having a molded hard rubber body substantially encasing same, a separate metal hub adapted to be rigidly clamped to the central portion of said molded wheel, said metal hub ring having projections thereon extending outwardly through the molded rubber and having metal to metal contact with said separate hub whereby the secure attachment between said hub and wheel is rendered independent of any subsequent shrinkage of the hard rubber body.

2. A steering wheel comprising a metal reinforcing spider having a central metal hub ring and a molded hard rubber body substantially encasing said spider and hub ring, a separate metal hub rigidly clamped upon the central portion of said wheel, said metal hub ring having portions thereof extending outwardly and engaging directly with said separate hub, whereby said hub is prevented from becoming loose after any subsequent shrinkage of the hard rubber body interposed between said hub and hub ring.

In testimony whereof I hereto affix my signature.

HARVEY D. GEYER.